United States Patent Office 3,117,980
Patented Jan. 14, 1964

3,117,980
α,α-DIALKYL-β-PROPIOLACTONES STABILIZED WITH TRINITROPHENOLS
James C. Martin, Kingsport, Tenn., assignor to Eastman Kodak Company, Rochester, N.Y., a corporation of New Jersey
No Drawing. Filed June 21, 1961, Ser. No. 126,764
6 Claims. (Cl. 260—343.9)

This invention relates to the prevention of premature polymerization of β-lactones by incorporating therein a small amount of a trinitrophenol.

It is well known that β-lactones polymerize when heated. This is especially true for α,α-dialkyl-β-propiolactones which tend to polymerize even at ordinary temperatures under storage conditions. Since the polymerization of α,α-dialkyl-β-propiolactones is very rapid and a great deal of heat is liberated, storage and handling of quantities of high purity monomer presents a potentially dangerous situation because of the possibility of accidental contamination leading to a violent exothermic polymerization. While commercial vinyl monomers are shipped containing inhibitors of the phenolic type such as hydroquinone and t-butyl catechol, the polymerization of unsaturated monomers of this type proceeds through a free radical mechanism and the inhibitors simply function as free radical scavengers or antioxidants. The polymerization of α,α-dialkyl-β-propiolactones, on the other hand, is not a free radical type of polymerization as indicated by the failure of conventional peroxide catalysts to promote the polymerization thereof (Example 6 herein), but proceeds through an ionic mechanism as reported by prior art investigators. In view of this, inhibitors against polymerization of α,α-dialkyl-β-propiolactones should not be confused with inhibitors of vinyl-type monomers. I have now found that α,α-dialkyl-β-propiolactones can be effectively inhibited against premature polymerization, thereby making it possible to store them without change for long periods of time, in fact, even for several months or more at elevated temperatures of 50°C., by incorporating into the monomer about from 0.01 to 2.0%, or even up to 5%, but preferably from 0.1 to 1.0% of a trinitrophenol, based on the weight of the monomer. Picric acid has been further found to be especially efficacious and is preferred as an inhibitor for α,α-dialkyl-β-propiolactones.

It is, accordingly, a principal object of the invention to provide stable α,α-dialkyl-β-propiolactones which may be stored for relatively long periods of time without polymerizing and which require no special storage temperature considerations. Other objects will become apparent hereinafter.

In accordance with the invention, I prepare the new compositions of the invention by adding to and mixing with α,α-dialkyl-β-propiolactone monomers having the general formula:

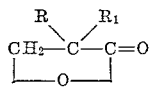

wherein each of R and R₁ represent alkyl groups of from 1–4 carbon atoms, e.g. methyl, ethyl, propyl, isopropyl, n-butyl, etc, groups, and wherein R and R₁ jointly represent the pentamethylene group —CH₂—(CH₂)₃—CH₂—, from 0.01 to 2.0% of a trinitrophenol represented by the general formula:

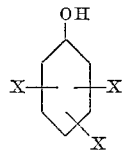

wherein X is a nitro group, e.g. 2,4,6-trinitrophenol (picric acid), 2,3,5-trinitrophenol, 2,3,6-trinitrophenol, 2,4,5-trinitrophenol, etc. Since these compounds are all crystalline solids, they can be added to the α,α-dialkyl-β-propiolactones in the form of fine powders or they can be dissolved in more concentrated form in some of the lactone and appropriate amounts of this solution can be added to the bulk of the lactone to produce the concentrations of the trinitrophenol coming within the above stated operable limits of the invention. Suitable α,α-dialkyl-β-propiolactones that can be stabilized against premature polymerization in accordance with the invention include α,α-dimethyl-β-propiolactone (pivalolactone), α,α-diethyl-β-propiolactone, α,α-dipropyl-β-propiolactone, α,α-diisopropyl-β-propiolactone, α,α-dibutyl-β-propiolactone, 2-ethyl-2-methylhydracrylic acid β-lactone, and the like. These may be prepared by the general method described in Kung, U.S. Patent No. 2,356,459, dated August 22, 1944, wherein a dialkyl ketene is reacted with formaldehyde. On removal from storage, the trinitrophenol inhibitor can be effectively removed from the stabilized α,α-dialkyl-β-propiolactones by a number of methods, for example, by flash distilling the stabilized lactone through a packed distilling column or by treating the chilled stabilized lactone with a cold, dilute solution of a bicarbonate such as sodium bicarbonate in water, separating the lactone layer and drying, for example, over anhydrous magnesium sulfate. The thus obtained α,α-dialkyl-β-propiolactone is of high purity and can be used directly as an intermediate for the preparation of other monomeric compounds, e.g. esters, acids, etc, or polymerized to high molecular weight polymers in the presence of suitable catalysts such as aliphatic, alicyclic and aromatic amines.

The following examples will serve further to illustrate the new compositions of the invention and the manner of their preparation and uses.

Example 1

This example demonstrates the ease of polymerization of monomeric pivalolactone at elevated temperatures.

A 1-ml. sample of pivalolactone (99.4% pure as determined by gas chromatography) was placed in a small glass, screw cap vial, purged with nitrogen, sealed and suspended in a steam bath. White lumps of polymer were noticed after 10 min. and the entire contents had set to a solid polymer after 30 min.

Example 2

A 1-ml. sample of pivalolactone containing 1% by weight of picric acid was bottled as described in Example 1 and suspended in a 50° C. constant temperature bath. After 3 months, no polymerization had taken place.

Example 3

In commercial shipping and handling of α,α-dialkyl-β-lactones temperatures higher than 50° C. are not likely to be encountered; however, I have tested several compounds at 100° C. in order to arrive at their ultimate ability as inhibitors. It should be kept in mind that at 50° C. these materials will function as inhibitors for much longer periods.

The following samples consisted of the stated amount of inhibitor in 1 ml. of pivalolactone sealed in small glass, screw cap vials and suspended in a steam bath (100° C.). The time required for polymerization is stated.

| Inhibitor and Percent: | | Time |
|---|---|---|
| 0.1% picric acid (2,4,6-trinitrophenol) | days | 2 |
| 1.0% picric acid | do | 6 |
| 1% 2,4-dinitrophenol | hr | 18 |
| 1% 2,6-dinitro-4-chlorophenol | hr | 16 |

Comparison of the polymerization times shown in the previous example with the time required for the uninhibited lactone to polymerize, as described in Example 1, shows that an enormous improvement has been achieved. Also, it will be clearly evident that picric acid is much superior to the dinitrophenols.

*Example 4*

The following example shows that an effective inhibitor can be readily removed from pivalolactone to give monomer that is suitable for polymerization purposes.

A sample (100 g.) of pivalolactone containing 0.1% by weight, of picric acid was allowed to stand for one month at room temperature. No polymerization was noticed. The sample was divided into 2 equal portions, A and B. A was flash distilled at 10 mm. through a 6 in. Vigreux column to recover 46 g. of pivalolactone. A 10-ml. sample of this material was dissolved in 20 ml. of isopropyl acetate and .05 ml. of triethylamine was added. The resulting solution was placed in a small flask under a condenser and heated on the steam bath for 30 min. The resulting polymer was recovered by filtration and dried. It had an inherent viscosity of 2.3, as measured in a mixture of 60% phenol and 40% tetrachloroethane. B was chilled to 5° C. and stirred for 5 min. with a cold, dilute solution of sodium bicarbonate in water. The organic layer was separated and dried over anhydrous magnesium sulfate. The resulting pivalolactone weighed 45.4 g. and had a purity of 99.6% as measured by gas chromatography. When a sample of this lactone was polymerized as described above, it gave a polymer with an inherent viscosity of 2.1, as measured in a mixture of 60% phenol and 40% tetrachloroethane.

*Example 5*

A 1-ml. sample of 2-ethyl-2-methylhydracrylic acid, β-lactone containing 0.5% by weight of picric acid was bottled as described in Example 1 and suspended in a 50° C. constant temperature bath. After 3 months, no polymerization had taken place.

*Example 6*

The following example demonstrates that peroxides are not catalysts for the polymerization of pivalolactone. In fact, when compared with Example 1 it will be noted that the benzoyl peroxide used in Example 6 actually showed a slight inhibitory action.

A 1-ml. sample of pivalolactone containing 1% by weight of benzoyl peroxide was bottled as described in Example 1 and suspended in a steam bath. Some polymer started forming after 40 min. and the entire contents were solid in 1 hr.

*Example 7*

For the purpose of comparison, a simple polymerization experiment is described using polymerization catalysts.

Into a large test tube was placed 10 ml. of pivalolactone containing 1 drop of triethylamine, and the tube was heated in the steam bath. A vigorous, exothermic polymerization started in about 30 sec. The entire contents of the tube set to a tough, horny polymer in less than 2 min. The polymer had an inherent viscosity of 1.93, as measured in a mixture of 60% phenol and 40% tetrachloroethane.

By substituting other of the mentioned α,α-dialkyl-β-propiolactones in the above examples generally similar good results are obtained, for example, with combinations of α,α-diethyl-β-propiolactone and picric acid, α,α-dipropyl-β-propiolactone and picric acid and α,α-dibutyl-β-propiolactone and picric acid. Also, in place of the picric acid in the preceding, a like amount of any other of the mentioned trinitrophenols can be used to provide effective prevention of premature polymerization of the mentioned α,α-dialkyl-β-propiolactones of the invention.

The invention has been described in detail with particular reference to preferred embodiments thereof, but it will be understood that variations and modifications can be effected within the spirit and scope of the invention as described hereinabove and as defined in the appended claims.

What I claim is:

1. A composition consisting essentially of an α,α-dialkyl-β-propiolactone having the formula:

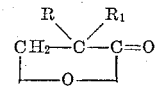

wherein each R and $R_1$ stands for an unsubstituted alkyl group of from 1–4 carbon atoms and taken jointly represent the unsubstituted pentamethylene group, and having dissolved therein from about 0.01% to about 5% based on the weight of the said lactone of a trinitrophenol selected from the group consisting of 2,4,6; 2,3,5; 2,4,5 and 2,3,6-trinitrophenols.

2. A composition consisting essentially of pivalolactone having dissolved therein from 0.01–2.0% of picric acid, based on the weight of the pivalolactone.

3. A composition consisting essentially of 2-ethyl-2-methylhydracrylic acid β-lactone having dissolved therein from 0.01–2.0% of picric acid, based on the weight of the 2-ethyl-2-methylhydracrylic acid β-lactone.

4. A composition consisting essentially of α,α-diethyl-β-propiolactone having dissolved therein from 0.01–2.0% of picric acid, based on the weight of the α,α-diethyl-β-propiolactone.

5. A composition consisting essentially of α,α-dipropyl-β-propiolactone having dissolved therein from 0.01–2.0% of picric acid, based on the weight of the α,α-dipropyl-β-propiolactone.

6. A composition consisting essentially of α,α-dibutyl-β-propiolactone having dissolved therein from 0.01–2.0% of picric acid, based on the weight of the α,α-dibutyl-β-propiolactone.

No references cited.